UNITED STATES PATENT OFFICE.

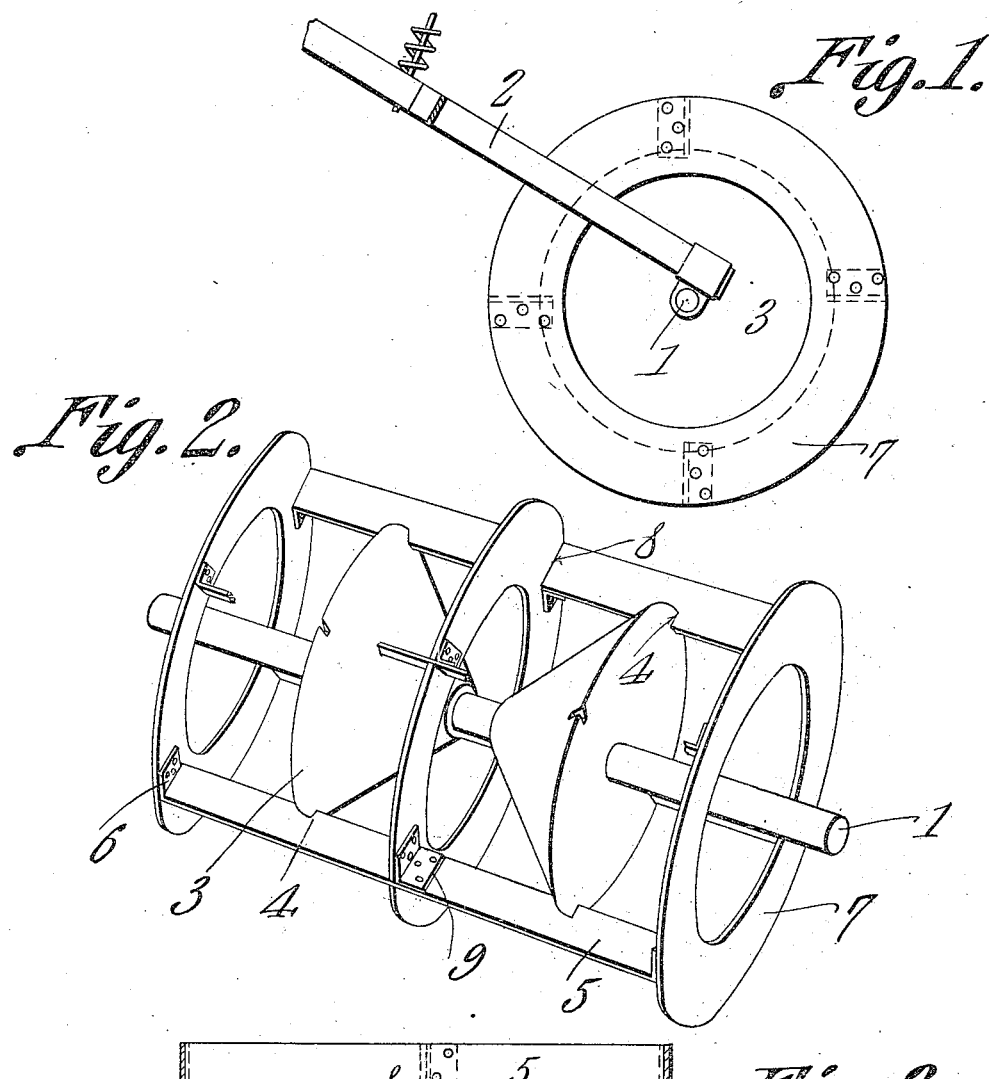

LEE SANDERS, OF BELCHERVILLE, TEXAS.

STALK-CUTTER.

961,988.  Specification of Letters Patent.  Patented June 21, 1910.

Application filed February 1, 1910. Serial No. 541,282.

*To all whom it may concern:*

Be it known that I, LEE SANDERS, a citizen of the United States, residing at Belcherville, in the county of Montague and State of Texas, have invented a new and useful Stalk-Cutter, of which the following is a specification.

This invention has relation to stalk cutters and it consists in the novel construction and arrangement of its parts as hereinafter shown and described.

The object of the invention is to provide a rotor of simple and durable structure which is so constructed as to effectually operate upon stalks as they stand or lie upon the soil for the purpose of reducing the same to sections or particles whereby they may be readily turned under at subsequent plowing.

With the above objects in view, the rotor includes a shaft with conical heads mounted thereon and chopping blades seated at their inner edge portion in recesses provided in the peripheries of the heads, the said blades being in parallel relation to the axis of the shaft. Annular blades surround the shaft and are disposed in planes at right angles to the axis of the shaft and are provided with recesses which receive the first said blades. Braces or strap irons are provided for effectually holding the parts together.

In the accompanying drawing,—Figure 1 is an end elevation of the rotor showing an arm attached thereto by means of which the said rotor may be connected with a spring. Fig. 2 is a perspective view of the rotor with parts broken away. Fig. 3 is a vertical longitudinal sectional view of the rotor.

The rotor includes a shaft 1 which as shown in Fig. 1, is journaled at its ends in arms 2. Conical heads 3 are fixed to the shaft 1 and the intermediate portions of the said heads are disposed conical surfaces of the said heads are disposed toward each other, the object of which will be explained later. The heads 3 are provided at their peripheries with radially disposed recesses 4. Blades 5 are seated at their inner edge portions in the recesses 4 of the heads 3 and are approximately parallel with the shaft 1. The said blades 5 are provided with angularly disposed end portions 6. Annular blades 7 surround the shaft 1 and are spaced at their inner edges from the periphery of the said shaft. The angularly disposed extremities 6 of the blades 5 are riveted or otherwise secured to the annular blades 7 in the vicinity of the ends of the shaft 1. As illustrated in the accompanying drawings, the said blades 7 are three in number, one located in the vicinity of each end of the shaft 1 and one located in a plane approximately midway between the outer ends of the conical heads 3. The last said blade 7 is provided at its periphery with a series of radially disposed recesses 8 which receive intermediate portions of the blade 5. Angle irons or strap irons 9 are attached to the intermediate portions of the blade 5 and the sides of the intermediate annular blades 7. The annular blades 7 are provided at their peripheries with cutting edges and are adapted to coöperate with the blades 5 as will be explained.

As the rotor passes over the soil with its periphery (generally speaking) in contact with the same the blades 5 will chop the stalks which are standing or which are lying in line or parallel with the line of draft of the rotor; while the blades 7 will chop the stalks which are transversely disposed to the line of draft or which are disposed at acute angles with the draft. Therefore it will be seen that the blades will chop the stalks irrespective of their position with relation to the line of draft of the rotor and by reason of the fact that the inner portions of the heads 3 are conical the possibility of stalks or soil wedging between the heads is reduced, for the outwardly inclined surfaces of the heads will permit the heads to draw away from the material after they have compressed the same. Again, by reason of the fact that the inner edges of the annular blades 7 are spaced from the periphery of the shaft 1 it is practically impossible for material such as stalks to wedge between the outer ends of the heads 3 and the outer annular blades 7. Again in the specific structure of the rotor, the blades which are parallel with the shaft serve as braces for the annular blades and vice versa and hence each part of the structure serves to assist in holding every other part of the structure in its proper relation.

Having described the invention what I claim as new and desire to secure by Letters Patent is:—

1. In a stalk cutter, a rotor comprising a shaft, conical heads mounted upon the shaft, radially disposed blades supported upon said conical heads, and annular blades supported upon said radially disposed blades.

2. In a stalk cutter, a rotor comprising a shaft, conical heads mounted upon the shaft and having their conical portions oppositely disposed, radially disposed blades mounted upon the said heads and annular blades supported upon said radially disposed blades.

3. In a stalk cutter, a rotor comprising a shaft, heads mounted upon the shaft and having at their peripheries radially disposed recesses, radially disposed blades having their inner edge portions seated in the recesses of the heads, and annular blades supported by said radially disposed blades.

4. In a stalk cutter, a rotor comprising a shaft, heads mounted upon the shaft and having radially disposed recesses at their peripheries, radially disposed blades having their inner edge portions seated in the recesses of the heads, said blades having their ends angularly disposed, annular blades secured to the angularly disposed ends of the said radially disposed blades, and an annular blade having at its periphery recesses which receive the intermediate portions of the radially disposed blades and angle irons applied to the intermediate portions of the said radially disposed blades at the sides of the last said annular blade.

In testimony that I claim the foregoing as my own, I have hereto affixed my signature in the presence of two witnesses.

LEE SANDERS.

Witnesses:
W. N. Merritt,
L. F. Fry.